(12) United States Patent
Panther

(10) Patent No.: US 6,468,171 B1
(45) Date of Patent: Oct. 22, 2002

(54) CONTROL DEVICE

(75) Inventor: Urban Panther, Seelbach (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 0 days.

(21) Appl. No.: 09/658,682

(22) Filed: Sep. 8, 2000

(30) Foreign Application Priority Data

| Sep. 9, 1999 | (DE) | 199 43 012 |
| Sep. 9, 1999 | (DE) | 199 43 009 |
| Sep. 13, 1999 | (DE) | 199 43 680 |
| Sep. 14, 1999 | (DE) | 199 43 927 |

(51) Int. Cl.⁷ ............................. F16H 59/00; F16H 63/00
(52) U.S. Cl. ............................. 474/28; 474/18
(58) Field of Search .................... 474/18, 28, 144, 474/146, 69; 74/606 R; 137/884

(56) References Cited

U.S. PATENT DOCUMENTS

| 5,462,344 A | * 10/1995 | Jakob et al. ............. 137/884 |
| 5,711,730 A | 1/1998 | Friedmann et al. |
| 5,845,672 A | * 12/1998 | Reuter et al. ............ 137/315 |
| 6,007,162 A | * 12/1999 | Hinz et al. ............. 303/119.3 |
| 6,056,908 A | * 5/2000 | Petrosky et al. .......... 74/606 R |
| 6,145,543 A | * 11/2000 | Ohishi et al. ............ 137/884 |

FOREIGN PATENT DOCUMENTS

| DE | 4227880 A1 | * 11/1993 |
| DE | 195 44 644 | 5/1996 |
| DE | 196 46 447 | 5/1998 |
| DE | 100 38 212 | 3/2001 |
| DE | 19950967 A1 | * 5/2001 |
| DE | 10037842 A1 | * 8/2001 |
| JP | P2000 159081 A | * 6/2000 |

* cited by examiner

Primary Examiner—David A. Bucci
Assistant Examiner—Marcus Charles
(74) Attorney, Agent, or Firm—Darby & Darby

(57) ABSTRACT

A control device for controlling a continuously variable cone-pulley transmission has a hydraulic control unit with one or more valves (110) in a hydraulic control unit housing (101) and an electronic control unit (151) with electronic components in an electronic control unit housing (150). The hydraulic control unit and the electronic control unit are connected as one modular unit, and a holding volume (160) for hydraulic fluid is provided between the hydraulic control unit housing (101) and the electronic control unit housing (150).

7 Claims, 2 Drawing Sheets

CONTROL DEVICE

BACKGROUND OF THE INVENTION

The invention relates to a control device of a hydraulic system, used in particular for controlling a transmission of a motor vehicle.

Continuously variable transmissions have become known, e.g., from DE 195 44 644. They are equipped with hydraulically controlled actuating members for setting the transmission ratio and for providing a secure compressive grip on a chain belt between the conical disks.

The actuating members are controlled by means of valves that are arranged in a valve housing as known, e.g., from DE 196 46 447. The valves are controlled by means of an electronic control circuit arranged in an electronic control unit. The electronic system is composed of an electronic control portion with electronic components such as computer chips or integrated circuits and an electronic power portion with power semiconductors for controlling the valves. Because of the actuating current required in some cases for the control of solenoid valves, a significant amount of heat is generated in the electronic control unit. As a result, there can be heat failures of at least individual components, depending on the temperature level of each component, whereby the reliable operation of the entire control device is put at risk.

OBJECT OF THE INVENTION

It is therefore the object of the present invention to improve the cooling of the electronic control unit and thereby provide a control device that works more reliably.

SUMMARY OF THE INVENTION

To meet this objective, the invention provides a control device with a hydraulic control unit and an electronic control unit, in particular for controlling a continuously variable cone-pulley transmission, with at least one valve arranged in a hydraulic control unit housing and with electronic components arranged in an electronic control unit housing. According to the invention, the hydraulic control unit and the electronic control unit are connected as one modular unit, and the aforementioned object of the invention is met by providing a holding volume for hydraulic fluid between the housing of the hydraulic control unit and the housing of the electronic control unit.

The holding volume or receptacle that is formed in this manner can receive, e.g., leakage fluid flowing from the hydraulic valves or the valve pistons of the hydraulic control unit. The holding volume is thereby filled with hydraulic fluid, which is more effective than air in carrying the heat away from the housing of the electronic control unit. Because the continuous supply of new leakage fluid during operation keeps the holding volume filled to overflow, the fluid that has been heated up by the electronic control unit is continuously transported away, resulting in improved cooling of the electronic control unit.

It is particularly advantageous if the holding volume is formed by a wall of the housing of the hydraulic control unit and a wall of the housing of the electronic control unit and in certain cases by at least one ridge.

In a particularly advantageous arrangement, the at least one ridge is part of the housing of the hydraulic control unit and/or the electronic control unit. It is also possible that the at least one ridge is interposed as a component between the respective walls of the two housings.

It is practical if the holding volume is open on one side, preferably at the top, to allow the heated fluid to run off and the newly arriving fluid to be taken in.

As a particularly advantageous feature, the holding volume is closed off by a seal between the housing of the hydraulic control unit and the housing of the electronic control unit or in the area of the ridge. This is of practical benefit in an embodiment of the invention, because it prevents an undefined outflow of fluid.

In another practical embodiment of the invention, it is especially practical if the surfaces where the housing of the hydraulic control unit and the housing of the electronic control unit and/or the ridge fit together are made fluid-tight to the farthest extent without the addition of a seal.

It is of particular advantage if the hydraulic control unit and the electronic control unit are screwed together so as to connect the two housings in a manner whereby the holding volume is essentially sealed in the area of the ridge.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The details of the invention will be discussed on the basis of the attached drawing, wherein.

DETAILED DESCRIPTION OF THE INVENTION

Figure 1:
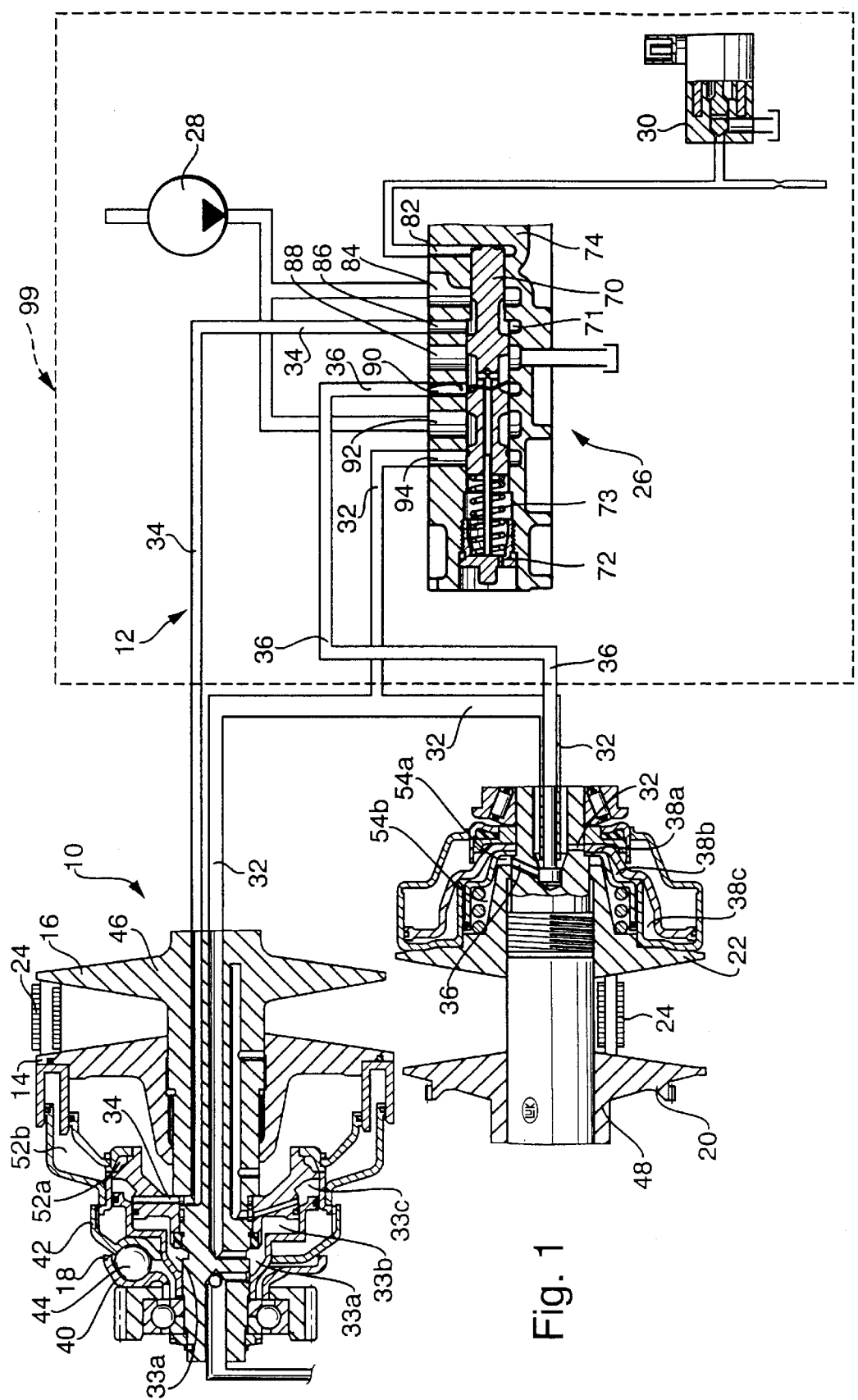
FIG. 1 represents a transmission with a hydraulic system with a valve.

FIG. 1 gives a schematic view of a first embodiment serving as an example of the invention. The continuously variable transmission 10, as used specifically in a motor vehicle (not shown), is controlled by a hydraulic system 12.

In particular, the continuously variable transmission 10 has a first pair of pulley discs 14, 16 with a torque-sensor device 18, a second pair of pulley discs 20, 22, as well as a torque-transmitting device in the form of a chain 24 that runs in a loop around the disc pairs.

The first disc pair 14, 16 has a conical disc 16 arranged essentially in an axially fixed position, and a conical disc 14 which, in the illustrated example, is arranged to be axially movable on the fixed conical disc 16. In a preferred arrangement, the distance between the disc pairs 14, 16 and 20, 22 is variable. With particular preference, however, the disc pairs are at a fixed distance from each other.

In particular, a non-variable distance between the disc pairs has the effect that by closing one disc pair, i.e., by narrowing the gap either between the discs 14 and 16 or between the discs 20 and 22, the chain 24 is caused to migrate radially outwards in the narrowing gap. However, because the chain has a defined, invariable length, the outward radial migration of the chain at one of the disc pairs 14, 16 or 20, 22, respectively, causes a commensurate inward migration of the chain at the other disc pair 20, 22 or 14, 16, respectively, at least in the assumed case of an invariable distance between the disc pairs. The inward radial migration, in turn causes the respective disc pair to open, i.e., to increase the gap between the discs of that pair.

Thus, when the discs of one of the pairs 14, 16 or 20, 22 are closed or pushed together, this has the effect of opening or pushing apart the other disc pair. Because the opening and closing of the disc pairs is accompanied by a change in the contact radius with the chain, i.e., the radius at which the force is transferred, the result is a change of the transmission ratio of the transmission 10. Depending on whether an external force is applied to the disc pair 14, 16 or the disc pair 20, 22, the transmission is shifted, respectively, in the direction towards "overdrive" or in the direction towards "underdrive". It should be noted that this applies to the illustrated example of FIG. 1, where the disc pair 14, 16 is arranged at the input side, i.e., the driven side of the transmission, while the disc pair 20, 22 is arranged at the output side.

It should be noted that the aforementioned shift movements of the discs are attributable to a net resultant force imbalance. This means in particular, that a force applied to one of the disc pairs will not cause a transmission shift, if a substantially equal force is applied to the other disc pair. For further clarification, there will also be no shifting movement in the disc pairs, even if the external forces applied to the movable discs 14 and 10 are unequal, if the disc pairs are overall in equilibrium.

The shifting movement of the disc pairs or, more precisely, the application of a corresponding shifting force according to the invention is performed in particular by the hydraulic system 12.

The hydraulic system 12 has a special two-fold function:

On the one hand, the hydraulic system generates a ratio-maintaining pressure on the disc pairs 14, 16 and 20, 22. The ratio-maintaining pressure ensures that a preset ratio of the transmission 10 remains unchanged, particularly while the transmission is running, unless a ratio shift is expressly called for.

On the other hand, the hydraulic system also serves to change the setting of the transmission ratio. This particular purpose is accomplished by applying an additional amount of pressure to one of the pairs of conical discs. In particular, the additional pressure is applied to the disc pair where at that point in time the chain 24 is running at a smaller contact radius. However, it should be noted that other ways of applying pressure to the discs are also within the scope of preferred embodiments. The aforementioned way of applying pressure is indicated, e.g., in the case where the chain is pushed radially outwards when an axial force is applied to the respective disc pair 14, 16 or 20, 22.

The control of the ratio-maintaining pressure and the ratio-shifting pressure is performed by a valve device 26. The valve device 26 is connected on the one hand to a hydraulic source 28 and, on the other hand, to a proportional valve device 30 that generates a biasing pressure. The downstream side of the valve device 26 (which will be explained in more detail in the context of FIG. 2) in the hydraulic flow is connected to the hydraulic conduit systems 32, 34, 36.

In particular, the valve device 26 allows the control of the intensity and/or direction of the volume flow through the hydraulic conduit systems 32, 34, 36.

The opposite or downstream ends (in relation to the valve device 26) of the hydraulic conduit systems 32, 34, 36 are connected to chambers or chamber systems that are associated with or included in the transmission 10.

Thus, a compressive contact force, preferably controllable in magnitude, is generated in the disc pairs 14, 16 and 20, 22 through the pressure conduit 32 and the chamber systems 33a, 33b, 33c and 38a, 38b, 38c.

Preferably, the torque sensor 18 is used to regulate, control or set the compressive contact force dependent on engine torque.

For example, the torque sensor can have a first, axially fixed part 40 and a second, movable part 42, with the two parts arranged to be rotatable in relation to each other at least through a segmental angular range. At least one of the two parts 40 and 42 has a curve disc or axially rising ramp with a gap-holder body, shown as a ball 44 in the illustrated example, arranged between the two parts.

The amount of rotation of the second element 42 in relation to the first element 40 depends on the amount of engine torque or, more precisely, on the amount of torque applied to the torque sensor 18. The rotation causes the ball 44 to move up the ramp, thereby increasing the distance between the axially fixed element and the axially movable element 42. This increase in distance is accompanied by a volume change of at least one of the chambers 33a, 33b, 33c, but particularly of the chamber 33a. Tied at least in part to the volume change, the pressure will change in at least one of the chambers 33a, 33b, so that a contact pressure or contact force can be generated that depends at least in part on the torque level present at the input of the transmission.

For example, this arrangement allows a "asymmetric" force to be generated on both of the disc pairs 14, 16 and 20, 22. This creates a tendency of pushing the chain 24 radially outwards at both disc pairs 14, 16 and 20, 22 simultaneously. Especially in the case where the resultant forces acting on the chain 24 at each disc pair are symmetric, the effect is that the chain will be held in place, also in relation to the radial direction. In particular, an adhesive friction force is acting between the chain 24 and the disc pairs 14, 16 and 20, 22. Due to these friction forces, it is possible to transmit a torque from the disc pair 14, 16 to the other disc pair 20, 22.

The transmission ratio between the shafts 46 and 48, i.e., between the disc pairs 14, 16 and 20, 22 can be changed by applying a ratio-changing pressure either to the disc pair 14, 16 or 20, 22 by means of the valve device 26 and the hydraulic conduit systems 36 or 34, respectively. In particular, the concept includes the provision that a ratio change in a first direction is effected by pressurizing a system consisting of at least one chamber through the hydraulic conduit system 34.

As described above, the conical discs 14, 16 will thereby be pushed closer together while, at the same time, the pressure communicated through the ratio-changing conduit 36 to the disc pair 20, 22 is essentially zero.

Analogously, a ratio change in the opposite direction is achieved by pressurizing at least one of the chambers 54a, 54b through the conduit system 36, whereby the radial distance of the chain 24 from the shaft of the disc pair 20, 22 is increased. At the same time, this has the effect of contracting the contact radius of the chain at the first disc pair 14, 16, i.e., at the first disc pair, the chain 24 moves radially inwards towards the axis of rotation.

It should be noted that the ratio-changing conduits 34, 36 which allow in particular the application of increased pressure to one of the disc pairs 14, 16 or 20, 22 can also be used to maintain an existing equilibrium position of the chain between the disc pairs 14, 16 and 20, 22. For example, with a constant pressure being applied in preferably equal magnitude to both of the disc pairs 14, 16 and 20, 22 through the conduit system 32, an additional pressure for maintaining the aforementioned equilibrium can be superimposed through the conduits 36 or 34, for example in a case where the force required on the disc pairs 14, 16 and 20, 22 depends on the selected transmission ratio. As an example, if the forces required for maintaining equilibrium in the disc pairs 14, 16 and 20, 22 are of different magnitude, it is possible to pressurize at least one of the disc pairs 14, 16 or 20, 22 with an additional, superimposed pressure through the hydraulic conduit 34 or 36, respectively, to secure an equilibrium position in a case where the latter is ratio-dependent.

The valve 26 consists of a valve piston 70 received and axially movable in a long bore hole 71. In the illustrated exemplary embodiment of FIG. 1, the valve piston 70 can be subjected to an axially directed pressure force acting in opposition to the resilient force of the spring 73. The end of the long bore hole 70 can be closed off by means of a cover plug 72 which can, e.g., be screwed into an internal thread of the bore hole 71 in the valve housing 74.

The system portion 99 that is framed by a broken line in FIG. 1 can be enclosed in a housing as a hydraulic control device module. In addition, the pump 28 can be bolted onto the hydraulic control device unit.

Figure 3:
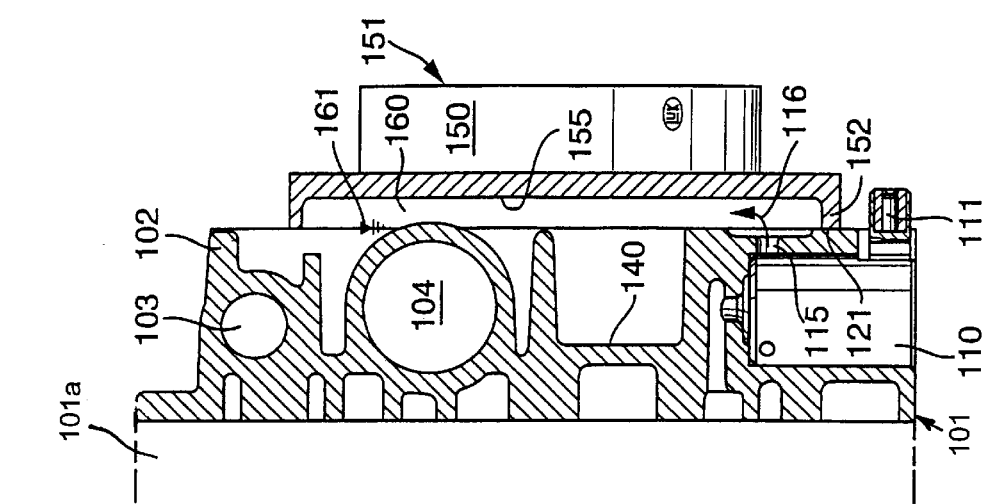
FIG. 3 represents a sectional view of the hydraulic control unit and the electronic control unit of FIG. 2, taken along the cross-sectional line III—III.
Figure 2:
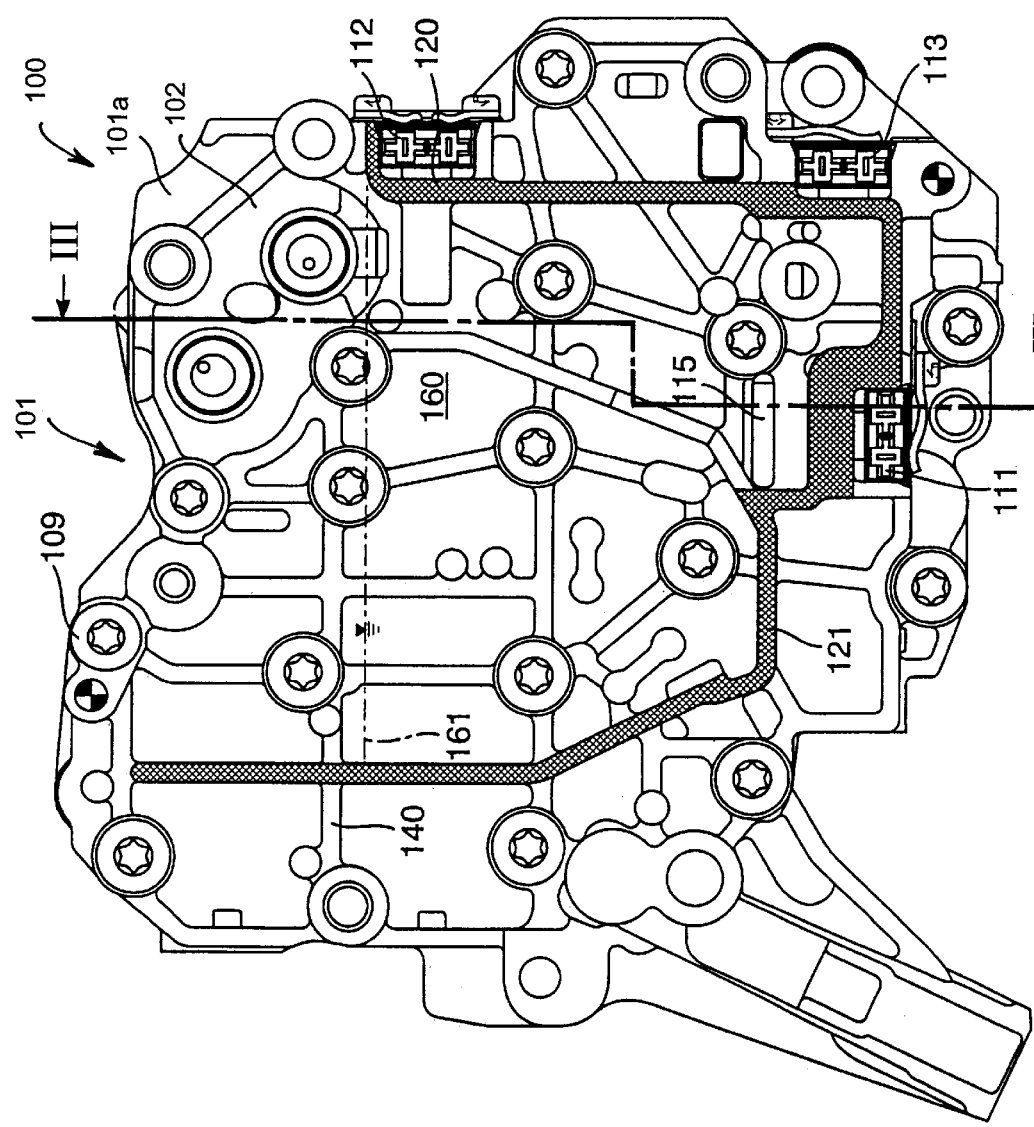
FIG. 2 represents a view of a hydraulic control unit.

FIG. 2 illustrates a hydraulic control unit 100 with a housing 101 made up in an advantageous manner of at least two housing shells 101a, 102 connected to each other through an interposed intermediate layer. FIG. 3 shows a sectional view, taken along lines III—III of FIG. 2, of the housing 101, wherein only the housing part 102 is represented in detail. The housing parts 101 and 102 are connected by means of screws 109.

The housing 101 has bore holes 103, 104 for the valve pistons and solenoid valves 110 in accordance with FIG. 1. Furthermore, solenoid valves 110 are accommodated at least in part in the housing 101. The solenoid valves have magnet coils (not shown) that can be connected by plugs 111, 112 and 113 to the electronic control unit that controls the solenoid valves for setting the desired flow rate or pressure.

The housing of the hydraulic control unit has a ridge 120 extending along a perimeter that is open at the top and forms a sealing and mating surface 121 that is contacted by the housing 150 of the electronic control unit 151. The ridge with the open topside is essentially U-shaped in the side view.

The holding volume 160 is enclosed by the walls 155 and 140 and by the ridge 120.

Preferably, the housing 150 of the electronic control unit, too, has a ridge 152 with a mating surface that contacts the ridge 120 when the hydraulic control unit is connected to the electronic control unit. It is also possible that one of the two units or one of the two housings does not have a ridge, so that the ridge of one unit is in contact with a mating surface of the other unit. It is practical if the mating surfaces are finished (by grinding) to a level where no special seal has to be used in the area of the mating surfaces. However, in another embodiment it can be advantageous, if a seal is provided between the mating surfaces in the area 121.

A holding volume 160 is formed between the hydraulic control unit 100 and the electronic control unit 151, where hydraulic fluid can be held up to a maximum fluid level 161 before the fluid overflows.

The holding volume is fed by a fluid stream 116 that arrives in the space 160 through the opening 115 of at least one valve 110. The fluid can consist, e.g., of leakage fluid from the valves, such as in particular the biasing valves or solenoid valves.

The newly arriving fluid keeps the fluid level in the holding volume 160 at its maximum, as cold fluid flows in continuously while heated fluid overflows at the upper rim. The heated fluid, which is heated at the housing wall 155 of the electronic control unit, rises up and exits at the overflow. The inflow of fresh leakage fluid through the opening 115 will keep the temperature of the fluid in the space 160 at an approximately constant level, so that the electronic control unit is cooled as the heat originating from the electrical components is passed on to the hydraulic fluid. The fluid is well suited for transporting heat, better than air, especially if the wall 155 of the housing of the electronic control unit is wetted by the fluid.

The fluid running off the overflow is collected in the sump and can be used for lubricating the transmission. The run-off oil can also be used to fill centrifugal oil bonnets of the continuously variable transmission or for the lubrication of bearings. The oil can furthermore be used for cooling other components of the transmission such as other valves.

This application is further related to the German patent applications DE 199 43 012, DE 199 43 680 and DE 199 43 927, whose content (and also the content of subsequent applications based on the priority of the original German applications) is expressly included by reference in the disclosure of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A control device for controlling a continuously variable cone-pulley transmission, comprising a hydraulic control unit with a hydraulic control unit housing and an electronic control unit with an electronic control unit housing, with at least one valve arranged in the hydraulic control unit housing and with electronic components arranged in the electronic control unit housing, wherein the hydraulic control unit housing and the electronic control unit housing are connected as one modular unit and a holding volume for hydraulic fluid is provided between the hydraulic control unit housing and the electronic control unit housing.

2. The control device of claim 1, wherein the control device further comprises at least one ridge, the hydraulic control unit housing comprises a hydraulic control unit housing wall, and the electronic control unit housing comprises an electronic control unit housing wall, and wherein further the holding volume is formed by the hydraulic control unit housing wall, the electronic control unit housing wall, and the at least one ridge.

3. The control device of claim 2, wherein the at least one ridge is part of at least one of the hydraulic control unit housing and the electronic control unit housing.

4. The control device of claim 2, wherein the holding volume is open on one side.

5. The control device of claim 4, wherein said one side is located at a top portion of the holding volume.

6. The control device of claim 1, further comprising a seal between the hydraulic control unit housing and the electronic control unit housing, wherein said seal serves the function of sealing the holding volume.

7. The control device of claim 1, wherein the hydraulic control unit and the electronic control unit are screwed together.

\* \* \* \* \*